United States Patent [19]

Kishi et al.

[11] Patent Number: 4,541,386

[45] Date of Patent: Sep. 17, 1985

[54] ABNORMALITY DETECTING APPARATUS FOR MEANS FOR SENSING OPERATING PARAMETERS OF AN INTERNAL COMBUSTION ENGINE

[75] Inventors: Noriyuki Kishi, Itabashi; Yoshikazu Hirao, Tokyo, both of Japan

[73] Assignee: Honda Giken Kogyo Kabushiki Kaisha, Tokyo, Japan

[21] Appl. No.: 619,790

[22] Filed: Jun. 12, 1984

[30] Foreign Application Priority Data

Jun. 30, 1983 [JP] Japan .................................. 58-118700

[51] Int. Cl.$^4$ ......................... F02B 3/00; G06F 11/04
[52] U.S. Cl. .................................... 123/479; 123/425; 123/480
[58] Field of Search .................. 123/479, 480, 425; 73/119 A, 116, 117.3, 1 R; 340/514; 375/10

[56] References Cited

U.S. PATENT DOCUMENTS

| | | | |
|---|---|---|---|
| 3,938,075 | 2/1976 | Reddy ................................. | 123/479 |
| 4,244,340 | 1/1981 | Herth et al. ........................ | 123/479 |
| 4,287,565 | 9/1981 | Haubner et al. .................... | 123/479 |
| 4,357,919 | 11/1982 | Hattori et al. ..................... | 123/479 |
| 4,378,771 | 4/1983 | Sawada et al. ..................... | 123/425 |
| 4,383,409 | 5/1983 | Otsuka et al. ..................... | 123/479 |
| 4,395,905 | 8/1983 | Fujimori et al. .................... | 123/479 |
| 4,408,584 | 10/1983 | Yabuhara et al. ................... | 123/479 |
| 4,471,739 | 9/1984 | Yamato et al. ..................... | 123/479 |
| 4,476,830 | 10/1984 | Hasegawa et al. .................. | 123/479 |

*Primary Examiner*—Raymond A. Nelli
*Attorney, Agent, or Firm*—Lyon & Lyon

[57] ABSTRACT

An abnormality detecting apparatus for detecting abnormality in sensing means for sensing a value of an operating parameter of an internal combustion engine in synchronism with generation of pulses of a signal indicative of predetermined rotational angle positions of said engine. When the sensed value of the operating parameter lies outside a predetermined range, first timer means measures time elapsed from the instant at which the sensed value of the operating parameter falls outside the predetermined range, and decision means decides that the operating parameter sensing means is faulty when the elapsed time measured by the first timer means exceeds a first predetermined period of time. Second timer means, which is reset each time a pulse of the above signal is generated, measures time elapsed from the instant at which it becomes reset, and is adapted to halt the measuring operation of the first timer means when the elapsed time measured by the second timer means reaches a second predetermined period of time which is shorter than the first predetermined period of time.

6 Claims, 7 Drawing Figures

ABNORMALITY DETECTING APPARATUS FOR MEANS FOR SENSING OPERATING PARAMETERS OF AN INTERNAL COMBUSTION ENGINE

BACKGROUND OF THE INVENTION

This invention relates to an apparatus for detecting an abnormality in means for sensing operating parameters of an internal combustion engine, and more particularly to an apparatus of this kind which is adapted to prevent erroneous diagnosis of detection of a fault in the operating parameter sensing means through monitoring of an output produced thereby when the rotational speed of the engine is below a predetermined value.

A fuel supply control system adapted for use with an internal combustion engine, particularly a gasoline engine is already known, which is adapted to determine the fuel injection period of a fuel injection device for control of the fuel injection quantity, i.e. the air/fuel ratio of an air/fuel mixture being supplied to the engine, by first determining a basic value of the above valve opening period as a function of sensed values of engine speed and intake pipe absolute pressure and then adding to and/or multiplying same by constants and/or coefficients determined as functions of sensed values of engine speed, intake pipe absolute pressure, engine temperature, throttle valve opening, exhaust gas ingredient concentration (oxygen concentration), etc., by electronic computing means.

Among the engine operating parameters set forth above, the values of such parameters as engine speed, intake passage absolute pressure and throttle valve opening change from moment to moment in dependence on engine operation. These parameter values therefore have a major influence upon engine operating performance, particularly driveability during acceleration and deceleration, fuel consumption and exhaust emission characteristics, unless they are detected accurately promptly upon change. To this end, according to the above known method, the values of such engine operating parameters are detected upon generation of each pulse indicative of a predetermined rotational angle position, e.g., each pulse of a top-dead-center position (TDC) signal, and the fuel injection quantity is determined by the use of these detected values, to thereby assure required driveability of the engine.

In a fuel supply control system of the type described above, the output value of a parameter sensor for detecting the value of an engine operating parameter may show an abnormal value ascribable to a disconnection in the wiring or the like. If the fuel injection quantity is determined by using this abnormal value, it will adversely affect the engine operation to deteriorate the driveability, etc. since the quantity of fuel injected will no longer be of an appropriate value. In such cases, therefore, measures need to be taken to assure engine operation even when a failure develops in the parameter sensing system including the parameter sensor. There are also cases where the output of a parameter sensor indicates an abnormal value not only when a failure occurs but also temporarily owing to noise or the like. In such cases, suitable means are needed to distinguish between an actual failure in the parameter sensing system and an abnormality indication ascribable to transient causes such as noise. To cope with such phenomenon, a known data processing system disclosed in, e.g., Japanese Provisional Patent Publication (Kokai) No. 55-115101 is operable, when an output value from a parameter sensor is indicative of an abnormal magnitude, to measure by means of a timer the period of time the sensor continuously produces the abnormal value and, so long as the measured value does not prevail a predetermined period of time, to forgo diagnosing the output value as indicative of a fault and determine the fuel injection quantity by using a normal value which prevailed immediately before the abnormal value is indicated by the parameter sensor output. Also known from Japanese Provisional Patent Publication (Kokai) No. 54-141926 is a system for determining the fuel quantity by using a preset value in place of a parameter sensor output value when the sensor output value falls outside a predetermined range of normal values.

With the above-described apparatus, particularly the former, it can be avoided that a temporary abnormality in the output of a parameter sensor ascribable to noise or the like is mistaken as a failure in the parameter sensing system. However, in a case where the apparatus senses a parameter value in synchronism with a TDC signal, as described above, the following problems occur. Specifically, assume a situation in which the value of a parameter sensed at generation of a pulse of the TDC signal just prior to engine stoppage indicates an abnormality ascribable to inputting of noise or the like to the sensing system, and that the engine happens to be stopped before the next pulse of the TDC signal is generated. If such is the case, then the abnormal value resulting from the inputting of the noise or the like will be retained as long as the ignition switch of the engine is closed. Since the timer will continuously measure the duration of the abnormal value as long as the abnormal value continues, the measured value of time will eventually exceed the predetermined time period. As a result, the parameter sensing system will be diagnosed as faulty and an emergency operation such as a fail-safe action, which is intended to compensate for a failure when an abnormality actually occurs in the parameter sensing system, will implemented needlessly.

SUMMARY OF THE INVENTION

It is therefore the object of the invention to provide an apparatus for detecting an abnormality in sensing means for sensing operating parameters of an internal combustion engine, which apparatus is capable of performing accurate abnormality determination by preventing erroneous diagnosis in determining whether the sensing means is operating abnormally.

According to the invention, there is provided an abnormality detecting apparatus for detecting abnormality in operating parameter sensing means for sensing a value of an operating parameter of an internal combustion engine in synchronism with generation of pulses of a signal indicative of predetermined rotational angle positions of the engine. Comparator means determines whether or not the deteced value of the operating parameter lies outside a predetermined range. First timer means is responsive to results of the determination by the comparator means for measuring, when the detected value of the operating parameter lies outside the predetermined range, time elapsed from the instant at which the detected value of the operating parameter falls outside the predetermined range. Decision means decides that the operating parameter sensing means is faulty when the elapsed time measured by the first timer means exceeds a first predetermined period of time.

Second timer means is disposed to be reset each time a pulse of the aforementioned rotational angle position signal is generated for measuring time elapsed from the instant at which it becomes reset. The second timer means is adapted to halt the measuring operation of the first timer means when the elapsed time measured by the second timer means reaches a second predetermined period of time which is shorter than the first predetermined period of time.

Preferably, the abnormality detecting apparatus according to the invention may further comprise generating means for generating reference clock pulses at fixed time intervals. The second timer means counts a number of pulses generated by the generating means.

The second timer means may be disposed to reset the elapsed time measured by the first timer means to zero and halt the measuring operation of the first timer means when pulses of a number corresponding to the second predetermined period of time are counted by the second timer means.

The operating parameter sensing means may preferably include pressure sensing means for detecting a value of pressure within the intake passage of the engine, valve opening sensing means for detecting the valve opening of a throttle valve in the intake passage, and intake air quantity sensing means for detecting a quantity of intake air supplied to the engine through the intake passage.

The above and other objects, features and advantages of the invention will be more apparent from the ensuing detailed description taken in connection with the accomanying drawings.

DETAILED DESCRIPTION

The invention will now be described in detail with reference to the drawings.

Figure 1:
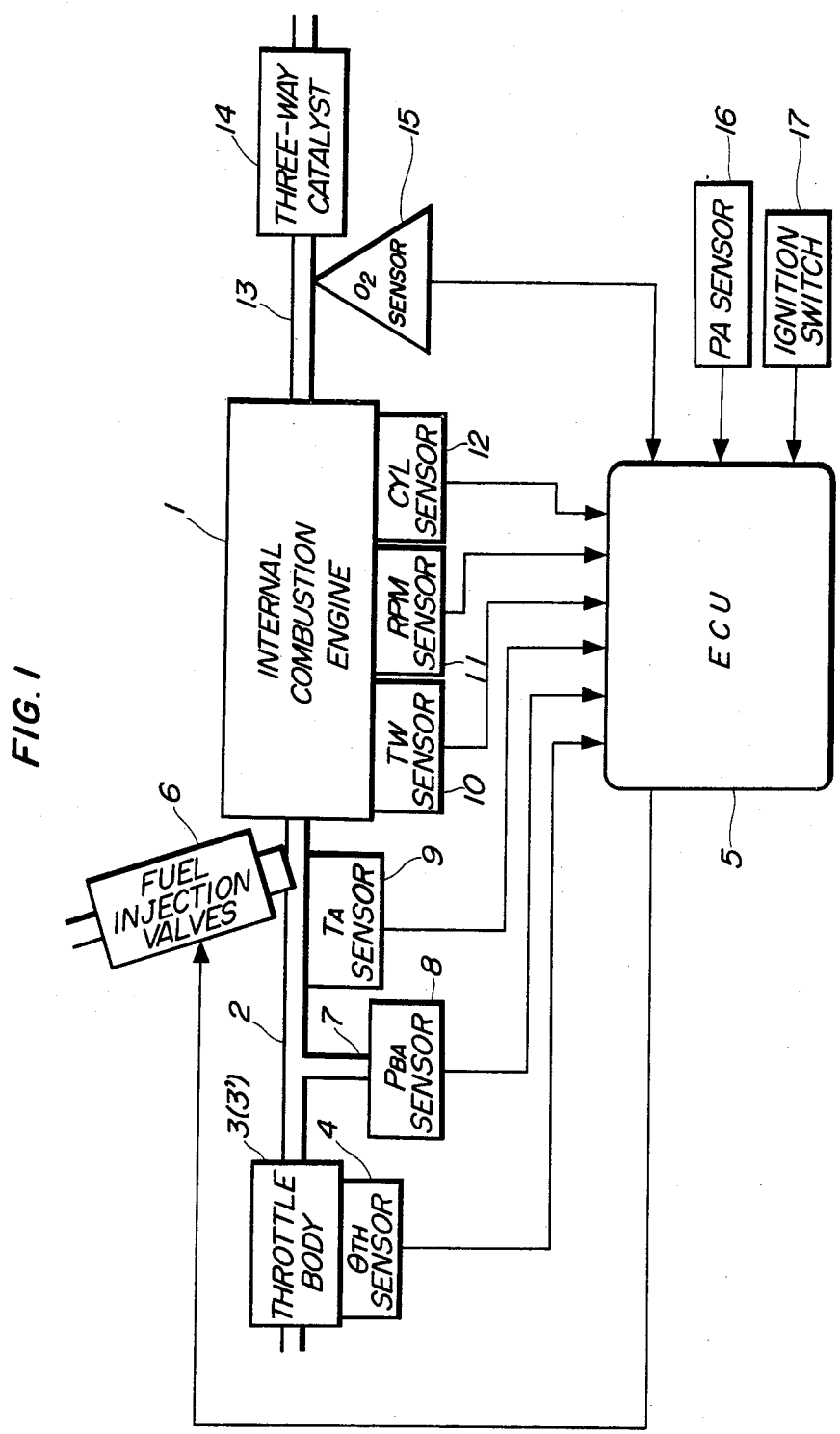
FIG. 1 is a block diagram illustrating the whole arrangement of a fuel supply control system for an internal combustion engine, to which the present invention is applied.

Referring first to FIG. 1, there is illustrated the whole arrangement of a fuel supply control system to which the device of the invention is applied. Reference numeral 1 denotes an internal combustion engine which may be of four-cylinder type, and to which is connected an intake passage 2 with a throttle body 3 arranged therein. A throttle valve opening ($\theta$th) sensor 4 is connected to a throttle valve 3' in the throttle body 3 for sensing its valve opening and is electrically connected to an electronic control unit (hereinafter called "the ECU") 5 to supply same with an electrical signal indicative of the sensed value of throttle valve opening.

Fuel injection valves 6 are arranged in the intake passage 2, each of which is located slightly upstream of an intake valve of a corresponding one of the engine cylinders, not shown, and between the engine 1 and throttle valve 3', for fuel supply to the corresponding engine cylinder. Each of the fuel injection valves 6 is mechanically connected to a fuel pump, not shown, and electrically connected to the ECU 5 in such a manner that the valve opening periods thereof are controlled by signals supplied by the ECU 5.

On the other hand, an absolute pressure (PBA) sensor 8 communicates through a conduit 7 with the interior of the intake passage 2 at a location downstream of the throttle valve 3'. The absolute pressure (PBA) sensor 8 is adapted to sense absolute pressure in the intake passage 2 and convert the sensed absolute pressure into an electrical signal which is applied to the ECU 5. An intake air temperature (TA) sensor 9 is arranged in the intake passage 2 at a location downstream of the absolute pressure (PBA) sensor 8 and converts intake air temperature detected thereby into an electrical signal which is delivered to the ECU 5.

An engine cooling water temperature (TW) sensor 10, which is constituted by a thermister or the like, is mounted in the cylinder block of the engine 1 in a manner embedded in the peripheral wall of an engine cylinder having its interior filled with cooling water. The sensor 10 senses the cooling water temperature and applies an electrical signal indicative thereof to the ECU 5.

An engine rotational speed (RPM) sensor 11 and a cylinder-discriminating (CYL) sensor 12 are arranged on a camshaft or crankshaft, neither of which is shown, of the engine 1. The former 11 is adapted to generate one pulse at a particular crank angle each time the engine crankshaft rotates through 180 degrees, i.e., each pulse of a top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 of the engine 1 for purifying ingredients HC, CO, and NOx contained in the exhaust gases. An O2 sensor 15 is inserted in the exhaust pipe 13 at a location upstream of the three-way catalyst 14 for detecting the concentration of oxygen in the exhaust gases and for supplying an electrical signal indicative of a detected concentration value to the ECU 5.

Further connected to the ECU 5 are a sensor 16 for detecting atmospheric pressure (PA) and an ignition switch 17 for starting the engine, these supplying the ECU 5 with electrical signals indicative of detected atmospheric pressure and of the on/off status thereof, respectively.

As will be described below, the ECU 5 determines whether or not the engine operating parameter signals supplied by these various sensors are abnormal and, if no abnormality is found to exist, calculates the fuel injection period TOUT of the fuel injection valves 6 by the use of the below-mentioned equation (1), at each generation of a pulse of the TDC signal, in response to the engine operating conditions:

$$TOUT = T_i \times K_1 + TK_2 \quad (1)$$

wherein Ti represents a basic value of the fuel injection period and is calculated as a function of the intake passage absolute pressure PBA and the engine speed Ne, and $K_1$ and $TK_2$ represent correction coefficients and correction values, respectively, which are dependent upon the values of engine operating parameter signals from the aforementioned various sensors, that is, the throttle valve opening sensor 4, the intake passage absolute pressure sensor 8, the intake air temperature sensor 9, the engine cooling water sensor 10, the RPM sensor 11, the cylinder-discriminating sensor 12, the $O_2$ sensor 15, the atmospheric pressure sensor 16, and the ignition switch 17, and which are calculated by the use of predetermined equations in response to the engine operating parameter signals, so as to optimize the startability, emission characteristics, fuel consumption, accelerability, etc. of the engine.

The ECU 5 supplies driving signals to the fuel injection valves 6 to open these valves with a duty factor corresponding to the fuel injection period TOUT calculated in the above manner.

Figure 2:
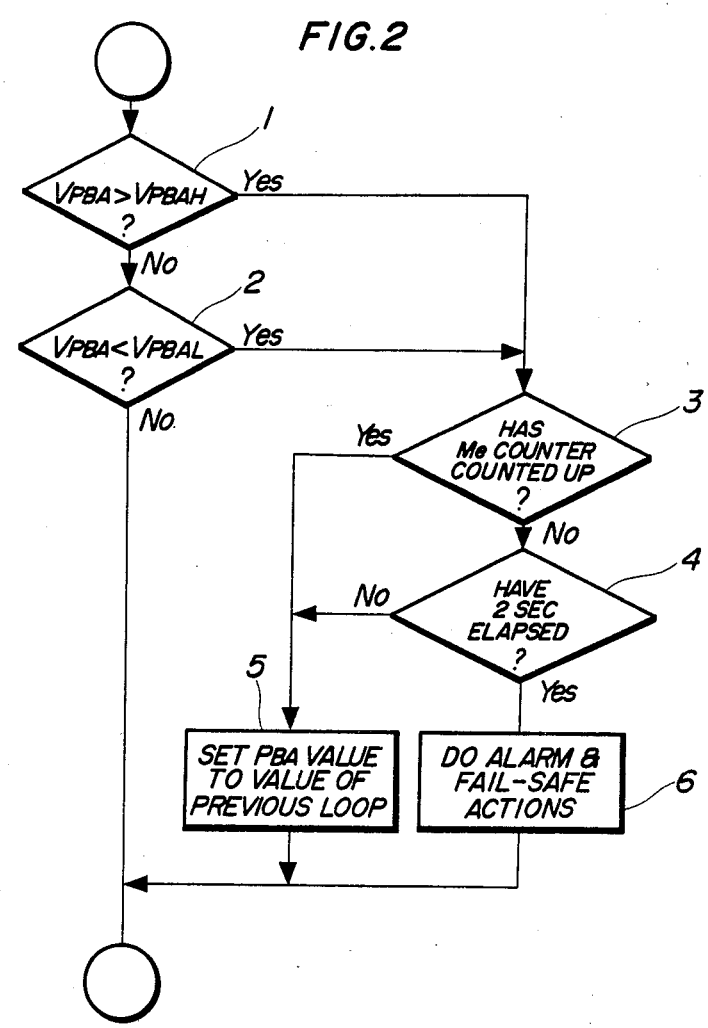
FIG. 2 is a flowchart showing a manner of detecting an abnormality in engine operating parameter sensing means, according to the present invention.

Illustrated in FIG. 2 is a flowchart which illustrates a manner of determining whether or not the value PBA of the absolute pressure signal supplied by the intake passage absolute pressure (PBA) sensor 8 is abnormal. A program according to this determining manner is performed within the ECU 5 at each generation of a pulse of the TDC signal.

First, it is determined whether or not the output voltage VPBA of the intake passage absolute pressure (PBA) sensor 8 lies within a normal range of voltages capable of being produced when the engine is operating in a normal state. More specifically, it is determined at step 1 of the flowchart whether or not the output voltage VPBA of the sensor 8 is higher than an upper limit value VPBAH (e.g., 4.9 v) of the normal voltage range, and at step 2 it is determined whether or not VPBA is less than a lower limit value VPBAL (e.g., 0.1 v) of the normal voltage range. If the answers to the steps 1 and 2 are both negative (NO), that is, if the output voltage VPBA of the absolute pressure (PBA) sensor 8 is within the normal range of voltages, then it is diagnosed that the PBA sensing system including the absolute pressure (PBA) sensor 8 is free of any abnormality and execution of the program for abnormality determination is terminated. If the answer to the question in the step 1 or the step 2 is affirmative (YES), then the program proceeds to step 3, where it is determined whether or not counting means, namely an ME counter described below, has finished counting up to a predetermined value. The Me counter has the value of its count reset each time a pulse of the TDC signal is generated. Specifically, the value of the count in the Me counter corresponds to a time interval between a point in time at which the immediately preceding pulse of the TDC signal was generated and a point in time at which the present pulse of the TDC signal is generated, and the reciprocal of the counted value is proportional to engine speed. The larger the counted value, therefore, the smaller the engine speed will be. If the counted value is less than a predetermined count (e.g., a number corresponding to 1.5 sec), namely if the operation for counting up to the predetermined number does not end within the interval between two successive pulses of the TDC signal (i.e., if the answer to the question at the step 3 is negative or NO), then the program proceeds to step 4. At this step it is determined whether or not a predetermined period of time, e.g., 2 sec, has elapsed from the start of execution of this step. The measurement of elapsed time at the step 4 is performed in a case where this step is executed continuously with each generation of a pulse of the TDC signal. Where the step 4 is not executed, the value of elapsed time previously measured at the step 4 is reset to zero. If the decision rendered at the step 4 is negative (NO), then the program moves to step 5, where the absolute sensed pressure PBA value is set to the value of the previous loop, that is, to a normal value which prevailed immediately before the sensed absolute pressure PBA value showed an abnormality. The fuel injection period TOUT is calculated on the basis of the equation (1) using this immediately preceding value.

If the answer to the question at the step 4 is affirmative (YES), namely the output voltage of the absolute pressure sensor 8 is outside the normal range of values and that this condition has continued for the above predetermined time period of 2 sec, then the sensing system of the absolute pressure sensor 8 is diagnosed as being faulty and, at step 6, alarm and fail-safe actions are implemented. Various alarm actions may be employed, an example of which is to actuate a warning device such as an alarm lamp. There are also various fail-safe actions that may be employed, an example of which is to set the absolute pressure PBA to a predetermined value which has already been stored in a memory, and calculate the fuel injection period TOUT on the basis of the equation (1) using this predetermined value.

If the answer to the question at the step 3 is affirmative (YES), that is, if the Me counter counts up to the predetermined value by the time the present pulse of the TDC signal is generated, then step 5 is executed without the program moving to the decision step 4. Since it is thus arranged to forgo execution of the decision step 4 when the value of the count recorded in the Me counter is greater than the predetermined count, namely when the engine speed Ne is below a value corresponding to the reciprocal of the predetermined count, the unnecessary execution of the fail-safe or other actions at the step 6 can be avoided even when the value of the output voltage of the absolute pressure sensor 8 temporarily falls outside the normal range of values just before the engine is stopped and such stoppage of the engine actually happens to occur while the sensor output voltage is temporarily outside the normal range of values.

Figure 3:
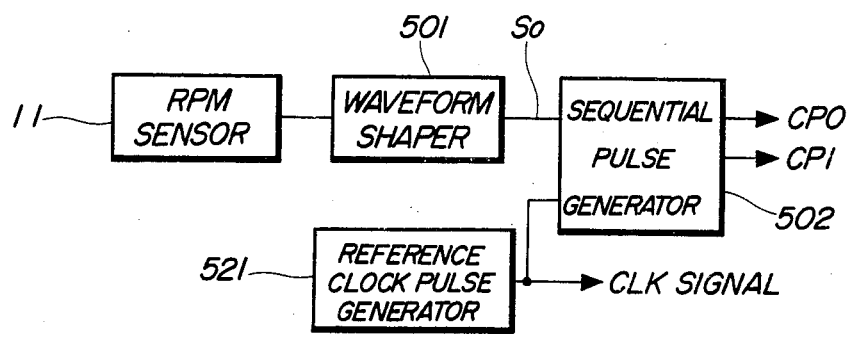
FIG. 3 is a circuit diagram showing a generator circuit constituting part of an electrical circuit within an electronic control unit (ECU) in FIG. 1 for detecting an abnormality in engine operating parameter sensing means, which generator circuit generates sequential pulses in synchronism with pulses of a TDC signal.
Figures 4, 5:
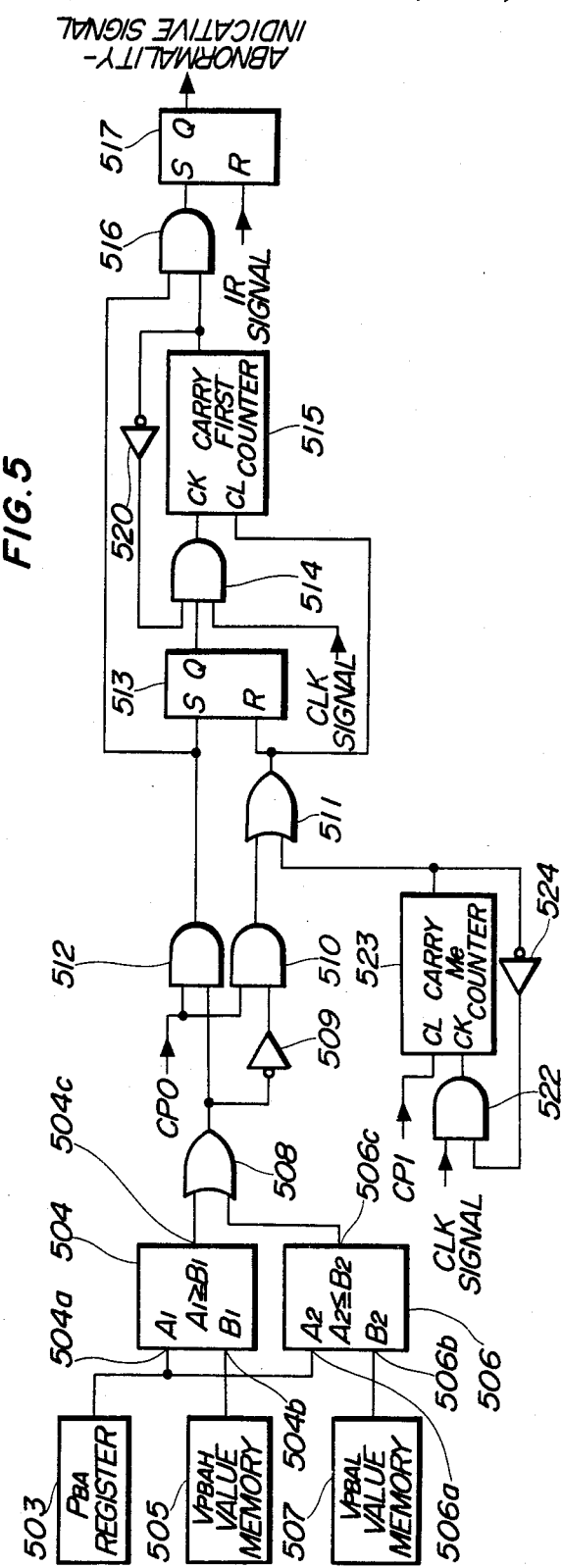
FIG. 4 is a timing chart showing the generation sequence of sequential pulses produced by the generator circuit of FIG. 3.
FIG. 5 is a circuit diagram illustrating the principal portion of the electrical circuit in the ECU of FIG. 1.
Figure 6:
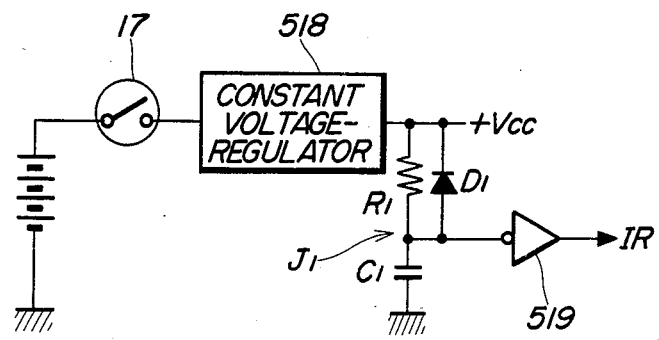
FIG. 6 is a circuit diagram showing another generator circuit constituting part of the electrical circuit within the ECU of FIG. 1 for detecting an abnormality in engine operating parameter sensing means, which generator circuit generates a single pulse IR when the ignition switch of the engine shown in FIG. 1 is closed.

FIGS. 3, 5 and 6 are circuit diagrams illustrating an example of circuitry incorporated within the ECU 5 for implementing the abnormality determination with respect to the output voltage of the absolute pressure (PBA) sensor 8 shown in FIG. 2. FIG. 4 is a timing chart of signals associated with the operation of the circuit shown in FIG. 3.

FIG. 3 illustrates an example of circuitry for generating sequential clock pulses CP0 and CP1 in synchronism with each pulse of the TDC signal. The sequential clock pulses CP0, CP1 are used by the circuit of FIG. 5, which is for determining whether the output voltage of the absolute pressure sensor 8 shown in FIG. 5 is abnormal. The TDC signal from the RPM sensor 11 of FIG. 1 is applied to a waveform shaper 501 which, each time a pulse of the TDC signal is supplied, shapes the pulse into a pulse signal So of a prescribed duration, as shown in FIG. 4. The pulse signal So is applied to a sequence clock generator 502 to set the generator into operation. Each time the pulse of the So signal arrives as an input thereto, the sequential clock generator 502 generates predetermined sequence clock pulses CP0, CP1 based on a reference clock signal CLK having a prescribed period supplied by an oscillator circuit 521. The timing chart of FIG. 4 shows the manner in which the sequential clock pulses CP0, CP1 are successively generated in synchronism with a pulse of the TDC signal.

An output signal VPBA produced by the intake passage absolute pressure sensor 8 is converted into a digital signal by an A/D converter, not shown, and the digitial signal is stored in a PBA register 503 shown in FIG. 5. The stored value VPBA is applied as values $A_1$, $A_2$ to input terminals 504a, 506a of respective comparator circuits 504, 506. Applied as a value $B_1$ to an input terminal 504b of the comparator circuit 504 is the aforementioned predetermined upper limit value VPBAH, which has been stored in a VPBAH value memory 505. Applied as a value $B_2$ to an input terminal 506b of the comparator circuit 506 is the aforementioned predetermined lower limit value VPBAL, which has been stored in a VPBAL value memory 507. When the comparator circuit 504 finds that the relationship $A_1 \geq B_1$ holds, that is, when the output voltage VPBA of the absolute pressure sensor 8 takes on an abnormal value which is greater than the predetermined upper limit value VPBAH, the comparator circuit 504 produces a high-level or logical "1" signal at an output terminal 504C thereof. On the other hand, when the comparator circuit 506 finds that the relationship $A_2 \leq B_2$ holds, that is, when the output voltage VPBA of the absolute pressure sensor 8 takes on an abnormal value which is less than the predetermined lower limit value VPBAL, the comparator circuit 506 produces a high-level or logical "1" signal at an output terminal 506C thereof.

When both of the output signals from the comparator circuits 504, 506 are at a low level, namely logical "0", that is, when the output voltage VPBA of the absolute pressure sensor 8 lies within the normal range of values bounded by the upper and lower limit values VPBAH, VPBAL, the high level "0" outputs produce a low-level signal "0" at the output of an OR gate 508. This logic is applied to one input terminal of an AND gate 512, thereby closing same, and to an inverter 509 whose output thereby goes high to apply the high-level signal "1" to one input terminal of an AND gate 510, which is opened as a result. Applied to the other input terminal of the AND gate 510 with each generation of the TDC signal pulse is the clock pulse CP0 of FIG. 3. The clock pulse CP0 is applied to the reset terminal R of a flip-flop 513 and to the clear terminal CL of a first counter 515 through the enabled AND gate 510 and an OR gate 511. With the arrival of the clock pulse CP0 at its reset terminal R, the flip-flop 513 produces a signal of value "0" at the Q output terminal thereof, which signal closes an AND gate 514. Upon inputting of the high-level signal "1" through its clear terminal CL, the first counter 515 has its count reset to zero, with the CARY output terminal of the counter being held at a low level "0". This low-level signal produced by the first counter 515 is applied to an AND gate 516, which is disabled as a result, and to an inverter 520 which converts the signal into a high level "1" signal that is coupled to the input side of the AND gate 514.

If either the comparator circuit 504 or 506 produces an output of a high or "1" level, that is, if the output voltage of the absolute pressure sensor 8 shows an abnormal value, then the high-level signal is applied to the inverter 509 through the OR gate 508, whereby the output of the inverter 509 changes in state to a low level "0", thereby closing the AND gate 510. Meanwhile, the AND gate 512 is enabled by the high-level signal arriving at one input terminal thereof from either the comparator circuit 504 or 506, so that a high-level signal of "1" is applied to a set terminal S of the flip-flop 513 in response to the clock pulse CP0 supplied to the other input terminal of the AND gate 512. The flip-flop 513 therefore produces a high level "1" signal at its Q-output terminal. This high-level signal, in cooperation with the high-level signal received from the inverter 520 through inversion of the signal produced at the CARRY output terminal of the first counter 515, places the AND gate 514 in the open state. The first counter 515 therefore has its count incremented each time it is supplied with a pulse of the reference clock signal CLK obtained from the oscillator 521 of FIG. 3 through its clock input terminal CK by way of the open AND gate 514.

When the value of the count in the first counter 515 attains a predetermined value corresponding to a predetermined period of time (two seconds), the output at the CARRY output terminal of the first counter 515 goes high, thereby opening the AND gate 516. The high-level signal is also applied to the inverter 520, whose output goes low as a result. This low-level signal closes the AND gate 514, thereby impeding supply of the reference clock signal pulses CLK to the clock input terminal CK of the first counter 515. While the AND gate 512 is open, the open AND gate 516 is also supplied with the clock pulse CP0 through the AND gate 512, at which time the AND gate 516 applies a high-level signal of "1" to the set terminal of the flip-flop 517, thereby causing the Q output terminal of the flip-flop 517 to produce a high level output "1". This high-level signal indicates that the sensing system to which the absolute pressure sensor 8 belongs is faulty.

When the output voltage VPBA of the absolute pressure sensor 8 returns to the normal range of values defined by the upper and lower limit values VPBAH, VPBAL before the count recorded in the first counter 515 attains the predetermined value, the output signals from both of the comparator circuits 504, 506 revert to a low level of "0", thereby resetting the flip-flop 513 through the OR gate 508, the inverter 509, the AND gate 510, and the OR gate 511. The resulting low-level signal at the Q-output terminal of the flip-flop 513 disables the AND gate 514, and at the same time the count in the first counter 515 is reset to zero, with the signal at the CARRY output terminal of the counter being held at a low level "0". In this case, therefore, the flip-flop 517 is not set.

Reference numeral 523 in FIG. 5 denotes a second counter, namely the Me counter mentioned earlier. With each generation of a pulse of the TDC signal, a clear terminal CL of the Me counter 523 is supplied with the clock pulse CP1 from the sequential pulse generator 502 of FIG. 3. The Me counter 523 has its count reset to zero each time the pulse CP1 is applied thereto, with the CARRY output terminal thereof being held at a low level "0". This low-level signal at the CARRY output terminal of the Me counter 523 is applied to an inverter 524, whose output goes high to open an AND gate 522 having one input terminal thereof connected to the output of the inverter 23. The reference clock signal CLK from the reference clock generator 521 of FIG. 3 is supplied to the clock input terminal CK of the Me counter 523 through the open AND gate 522. Each time a pulse of the reference clock CLK is supplied through its clock input terminal CK, the value of the count in the Me counter 523 is incremented by one count.

The value of the count recorded by the Me counter grows larger with a lengthening of the interval between the generation of successive pulses of the TDC signal brought about by a decrease in the engine speed Ne. When the counted value attains a predetermined value (e.g., a counted value corresponding to 1.5 sec), the signal at the CARRY output terminal of the Me counter 523 goes high. The high-level signal acts through the OR gate 511 to reset the flip-flop 513 and to reset the value of the count in the first counter 515 to zero. After the value of the count recorded by the Me counter 523 reaches a predetermined value, therefore, the flip-flop 513 is held in the reset state. Accordingly, the flip-flop 513 will not be set even if the output signal of the absolute pressure sensor 8 indicates an abnormal value, with the result that the counting action of the first counter 515 will remain inhibited. The flip-flop 517 in turn will not produce the abnormality indicating signal at its Q-output terminal.

It should be noted that once the flip-flop 517 has been set, the abnormality indicating signal at the output thereof is maintained until an IR signal, which is generated only when the ignition switch of the engine, described below, is turned from off to on, enters the reset terminal R of the flip-flop 517. In other words, when it is detected that the sensing system of the absolute pressure sensor 8 is abnormal, the abnormality indicating signal continues to be generated at least until the ignition switch is restored from the off to the on position. The abnormality indicating signal actuates the warning device, e.g. the alarm lamp, not shown, previously described in connection with FIG. 2, and is also used as a signal in response to which a fail-safe action is performed to compensate for the faulty sensing system including the absolute pressure sensor 8.

FIG. 6 is a circuit diagram for generating the aforementioned IR signal when the ignition switch 17 is closed. When the ignition switch 17 is closed, a voltage produced by a battery is supplied to a constant-voltage regulated power supply 518, which in turn generates a constant voltage +Vcc. At the same time the consant voltage starts to be generated, a low-level pulse is produced at a junction J1 of a pulse generating circuit comprising a resistor R1 and a capacitor C1 connected serially between the ground and the output side of the constant-voltage regulated power supply 518, and a diode D1 connected in parallel with the resistor R1 between the output side of the constant-voltage regulated power supply 518 and the junction J1, the junction J1 tying the resistor R1 and the capacitor C1 together. The low-level pulse is inverted by an inverter 519 into a high-level pulse, namely the signal IR. The IR signal consisting of this single pulse is generated only when the ignition switch 17 is closed, as described above, and is applied to the reset terminal R of the flip-flop 517, thereby causing the Q-output terminal of the flip-flop to generate a low-level signal of "0".

Figure 7:
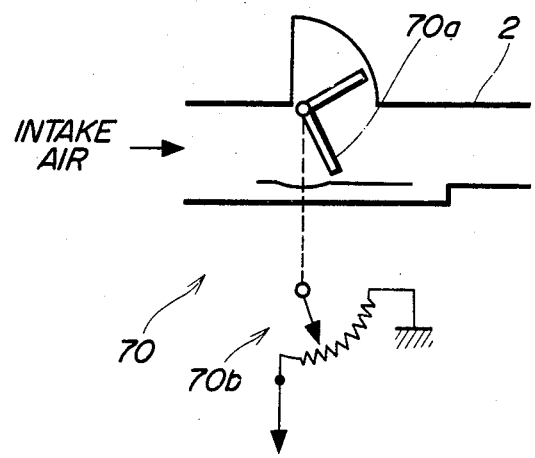
FIG. 7 is a schematic view illustrating means for sensing the intake air quantity arranged in an intake passage of the engine upstream of a throttle valve therein.

Although the illustrated embodiment has been described in connection with an intake passage absolute pressure sensor as one of the engine operating parameter sensors, the present invention is similarly applicable to any of the other parameter sensors, such as a throttle valve opening sensor for detecting throttle valve opening. Another example of an engine operating parameter to which the present invention may be applied is a well-known intake air quantity sensor 70, shown in FIG. 7, which is arranged in the intake passage 2 of the engine at a location upstream of the throttle valve 3', not shown in FIG. 7, and comprises a damper 70a and a potentiometer 70b for sensing the amount of back-and-forth rotation of the damper 70a. The construction and operation of apparatus for detecting an abnormality in these and other parameter sensors can be readily inferred from the foregoing embodiment, and a description thereof is therefore omitted.

What is claimed is:

1. An abnormality detecting apparatus for detecting abnormality in operating parameter sensing means for sensing the value of an operating parameter of an internal combustion engine in synchronism with generation of pulses of a signal indicative of predetermined rotational angle positions of said engine, said apparatus comprising:

comparator means for determining whether or not the detected value of said operating parameter lies outside a predetermined range which is a normal range of output of said operating parameter sensing means, that is capable of being produced when said engine is operating in a normal state;

first timer means responsive to results of said determination by said comparator means for measuring, when the detected value of said operating parameter lies outside said predetermined range, time elapsed from the instant at which the detected value of said operating parameter falls outside said predetermined range;

decision means for deciding that said operating parameter sensing means is faulty when the elapsed time measured by said first timer means exceeds a first predetermined period of time; and second timer means disposed to be reset each time a pulse of said signal is generated for measuring time elapsed from the instant at which it becomes reset;

said second timer means being adapted to halt the measuring operation of said first timer means when the elapsed time measured by said second timer means reaches a second predetermined period of time which is shorter than said first predetermined period of time, whereby the detection of abnormality in said operating parameter sensing means is interrupted.

2. An abnormality detecting apparatus as claimed in claim 1, further comprising generating means for generating reference clock pulses at fixed time intervals, and wherein said second timer means counts a number of pulses generated by said generating means.

3. An abnormality detecting apparatus as claimed in claim 2, wherein said second timer means resets the elapsed time measured by said first timer means to zero and halts the measuring operation of said first timer means when pulses of a number corresponding to said second predetermined period of time are counted by said second timer means.

4. An abnormality detecting apparatus as claimed in claim 1, wherein said internal combustion engine has an intake passage, said operating parameter sensing means being pressure sensing means for detecting a value of pressure within said intake passage.

5. An abnormality detecting apparatus as claimed in claim 1, wherein said internal combustion engine has an intake passage and a throttle valve arranged within said intake passage, said operating parameter sensing means being valve opening sensing means for detecting the valve opening of said throttle valve.

6. An abnormality detecting apparatus as claimed in claim 1, wherein said internal combustion engine has an intake passage, said operating parameter sensing means being intake air quantity sensing means for detecting a quantity of intake air supplied to the engine through said intake passage.

* * * * *

UNITED STATES PATENT AND TRADEMARK OFFICE
CERTIFICATE OF CORRECTION

PATENT NO. : 4,541,386
DATED : September 17, 1985
INVENTOR(S) : Noriyuki Kishi and Yoshikazu Hirao It is certified that error appears in the above-identified patent and that said Letters Patent are hereby corrected as shown below:

In Item 73 please add another Assignee below:

Oki Electric Industry Co., Ltd.

Signed and Sealed this

Eleventh Day of March 1986

[SEAL]

Attest:

DONALD J. QUIGG

Attesting Officer    Commissioner of Patents and Trademarks